United States Patent
Matsuoka et al.

(10) Patent No.: US 11,505,321 B2
(45) Date of Patent: Nov. 22, 2022

(54) UNDERFLOOR WIRE ROUTING SYSTEM FOR PASSENGER CABIN

(71) Applicant: THE BOEING COMPANY, Chicago, IL (US)

(72) Inventors: Alexander J. Matsuoka, Kirkland, WA (US); Colin R. Kreiger, Lake Stevens, WA (US)

(73) Assignee: THE BOEING COMPANY, Chicago, IL (US)

( * ) Notice: Subject to any disclaimer, the term of this patent is extended or adjusted under 35 U.S.C. 154(b) by 228 days.

(21) Appl. No.: 16/901,155

(22) Filed: Jun. 15, 2020

(65) Prior Publication Data

US 2021/0387730 A1    Dec. 16, 2021

(51) Int. Cl.
*H02G 3/04* (2006.01)
*B64D 11/06* (2006.01)
(Continued)

(52) U.S. Cl.
CPC ............ *B64D 11/0624* (2014.12); *B64C 1/20* (2013.01); *H02G 3/045* (2013.01); *H02G 3/30* (2013.01);
(Continued)

(58) Field of Classification Search
CPC ... B60R 16/0207; B60R 16/0215; B60R 1/04; B60R 13/0206; B60R 22/26; B60R 21/207; H02G 3/32; H02G 3/0487; H02G 3/30; H02G 11/00; H02G 3/0468; H02G 3/04; H02G 3/22; H02G 11/006; H02G 3/0418; H02G 3/0437; H02G 3/0481; H02G 3/0462; H02G 3/045; H02G 3/0406; H02G 3/088; H02G 15/013; H02G 3/0475; H02G 3/00; H02G 3/26; H02G 3/34; H02G 1/06; H02G 3/0456; H02G 3/0443; H02G 3/185; H02G 3/285; H02G 3/385; H02G 3/06; H02G 3/24; H02G 3/36; H02G 3/388;
(Continued)

(56) References Cited

U.S. PATENT DOCUMENTS 229,250 A  *  6/1880  Hammond ............... B23C 9/00
                                                        407/120
2,921,607 A  *  1/1960  Caveney ............. H02G 3/0418
                                                         24/561
(Continued)

FOREIGN PATENT DOCUMENTS

| EP | 0785385 A1 | 7/1997 |
|---|---|---|
| JP | 10112922 | 10/1996 |
| JP | 2005059745 A | 3/2005 |

OTHER PUBLICATIONS

Extended European Search Report for EP Application No. EP21168400 dated Sep. 22, 2021.
(Continued)

*Primary Examiner* — Krystal Robinson
(74) *Attorney, Agent, or Firm* — Marshall, Gerstein & Borun LLP (57) ABSTRACT

An apparatus for securing a raceway assembly within an aircraft, which includes a clip assembly associated with the raceway assembly, which secures the raceway assembly to a seat rail. The apparatus further includes a floor panel positioned in overlying relationship to the raceway assembly and the clip assembly.

20 Claims, 11 Drawing Sheets

(51) Int. Cl.
*B64C 1/20* (2006.01)
*H02G 3/30* (2006.01)
*H02G 3/38* (2006.01)
*H02G 3/00* (2006.01)

(52) U.S. Cl.
CPC ......... *B64D 2221/00* (2013.01); *H02G 3/263* (2013.01); *H02G 3/383* (2013.01)

(58) Field of Classification Search
CPC .......... H02G 1/00; H02G 3/081; H02G 3/383; H02G 15/113; H02G 3/0608; H02G 3/105; H02G 3/18; H02G 3/08; H02G 3/263; H02G 11/02; H02G 15/007; H02G 15/043; H02G 15/10; H02G 3/0616; H02G 3/0625; H02G 3/083; H02G 3/10; H02G 3/16; H02G 3/28; H01B 7/40; H01B 17/38; B64C 1/18
USPC ........................................ 174/72 A; 52/220.7
See application file for complete search history.

(56) References Cited

U.S. PATENT DOCUMENTS

| | | | |
|---|---|---|---|
| 2,939,513 A | 6/1960 | Leslie et al. | |
| 3,024,301 A * | 3/1962 | Walch | H02G 3/0443 |
| | | | 174/101 |
| 3,029,964 A | 4/1962 | Hudson et al. | |
| 3,318,476 A | 5/1967 | Clark | |
| 3,363,050 A * | 1/1968 | Martin | H02G 3/045 |
| | | | 138/155 |
| 3,578,274 A * | 5/1971 | Ginn | B64D 11/0696 |
| | | | 24/DIG. 42 |
| 3,636,984 A * | 1/1972 | Rauhauser | H02G 3/0418 |
| | | | 138/158 |
| 3,696,461 A * | 10/1972 | Kelly | A47G 27/0462 |
| | | | 16/16 |
| 3,906,146 A * | 9/1975 | Taylor | H02G 3/0608 |
| | | | 174/101 |
| 3,968,322 A * | 7/1976 | Taylor | H02G 3/045 |
| | | | 174/101 |
| 5,048,886 A | 9/1991 | Ito et al. | |
| 5,060,114 A | 10/1991 | Feinberg et al. | |
| 5,111,627 A | 5/1992 | Brown | |
| 5,477,649 A | 12/1995 | Bessert | |
| 5,483,853 A | 1/1996 | Moradell et al. | |
| 5,668,357 A | 9/1997 | Takiguchi et al. | |
| 5,898,132 A * | 4/1999 | Lee | H02G 3/045 |
| | | | 16/268 |
| 5,950,978 A | 9/1999 | Eguchi et al. | |
| 6,011,318 A | 1/2000 | Mayoras et al. | |
| 6,380,484 B1 * | 4/2002 | Theis | F16L 3/26 |
| | | | 174/101 |
| 6,429,544 B1 | 8/2002 | Sasaki et al. | |
| 6,527,566 B1 | 3/2003 | Lambiaso | |
| 7,049,508 B2 * | 5/2006 | Bushey | H02G 3/0425 |
| | | | 174/68.3 |
| 7,191,981 B2 | 3/2007 | Laib et al. | |
| 7,265,984 B2 | 9/2007 | Numata | |
| 7,503,522 B2 * | 3/2009 | Henley | B64D 11/0624 |
| | | | 244/118.5 |
| 8,353,561 B2 | 1/2013 | Yamazaki et al. | |
| 8,686,286 B2 | 4/2014 | Sekino et al. | |
| 9,401,591 B2 | 7/2016 | Satou et al. | |
| 9,573,536 B2 | 2/2017 | Katou et al. | |
| 9,907,208 B2 | 2/2018 | Bose et al. | |
| 10,038,314 B2 | 7/2018 | Satou et al. | |
| 10,522,990 B1 | 12/2019 | Klein | |
| 2001/0010424 A1 | 8/2001 | Osmer et al. | |
| 2002/0050730 A1 | 5/2002 | Kondo et al. | |
| 2002/0144835 A1 * | 10/2002 | Samhammer | H02G 3/0487 |
| | | | 174/72 A |
| 2002/0182027 A1 * | 12/2002 | Gauron | F16B 37/043 |
| | | | 411/112 |
| 2004/0129445 A1 * | 7/2004 | Winkelbach | H02G 3/34 |
| | | | 174/76 |
| 2005/0035622 A1 | 2/2005 | Tsubaki et al. | |
| 2006/0176672 A1 | 8/2006 | Kamemoto et al. | |
| 2006/0185274 A1 * | 8/2006 | Merica | E04B 2/90 |
| | | | 52/235 |
| 2006/0199416 A1 | 9/2006 | Tsubaki | |
| 2008/0142260 A1 | 6/2008 | Yamaguchi | |
| 2010/0213314 A1 * | 8/2010 | Haselmeier | H02G 3/0487 |
| | | | 244/119 |
| 2014/0110008 A1 * | 4/2014 | Mansell | F16L 23/167 |
| | | | 138/109 |
| 2015/0319880 A1 | 11/2015 | Strickland et al. | |
| 2018/0260003 A1 | 9/2018 | Honma et al. | |

OTHER PUBLICATIONS

Non-Final Office Action for U.S. Appl. No. 16/116,182 dated Apr. 2, 2019.

Notice of Allowance for U.S. Appl. No. 16/116,182 dated Aug. 16, 2019.

* cited by examiner

UNDERFLOOR WIRE ROUTING SYSTEM FOR PASSENGER CABIN

FIELD

This disclosure relates to wiring runs within an aircraft and more particularly to securing routing apparatus which carry wires, cables and/or tubes positioned below a floor of a cabin of an aircraft.

BACKGROUND

Wiring runs are needed for particularly servicing passengers seated within a passenger cabin of an aircraft or to service different locations within a cabin of a cargo aircraft. The wires within the wiring runs, in some examples, need to be routed along the length of the cabin to individual seats or to various locations with respect to a cargo cabin so as to deliver various amenities to those locations. Such amenities can include, for example, power, data, in-flight entertainment, seat actuation, lighting and the like. Other amenities that can be similarly delivered to various locations with the cabin can be by way of a tube which can carry such items as pneumatic power or consumable fluids.

Currently wiring runs, as referred to herein, can include wires, cables and/or tubes as mentioned above, which are placed within a conduit. The conduit is installed to the floor of the aircraft within the cabin with use of an adhesive. The conduit is covered with aircraft floor material such as a carpet or a mat, which results in bumps and discontinuities positioned in the floor covering. In addition, the carpet or the mat requires additional seams to provide in the floor covering for wire breakout locations, where cables, wires and/or tubes exit the conduit, for servicing the particular location in the cabin. These wire runs, for various aircraft, result in numerous configurations that are difficult to manage from an engineering perspective and difficult to install.

Current installation of a wiring run on the floor involves installation of secondary shielding layers, with respect to a particular aircraft design, for protecting wiring runs from damage from contact sources such as passengers or freight. The secondary shielding adds weight to the aircraft and increases operational cost as well as installation cost. Installation on the floor is further prone to error and is not ergonomic for installers based on excessive time spent in awkward and kneeling positions.

Other current installations of wire runs utilize raceways which position the wire runs beneath the cabin floor of the aircraft and which introduce other installation problems such as being restricted to wing forward installation in some aircraft as a result of various space integration interferences. Moreover, in other current installations of wire runs positioned beneath the cabin floor of the aircraft, the wire runs are positioned in a raceway. The installation of the raceway requires use of a first clip member on one side of the raceway engaging a portion of a seat rail member and a second clip member positioned on an opposing side of the raceway which engages a floor panel, wherein the floor panel is not positioned in an overlying relationship to the raceway. This arrangement creates challenges in removing and reinstalling the floor panel with respect to the second clip which is experienced in maintenance operations. In addition, this assembly positions a large track cover panel in overlying relationship to the raceway, which is heavier than a floor panel and adds to cost of operation. This assembly also employs a strength rod which extends across the raceway and is positioned below the track cover panel providing complications in installation and removal of the strength rods as needed when accessing contents of the raceway.

There is a need to integrate underfloor raceway with an airplane structure to eliminate other system dependencies required for installation and provide for a design solution that can have wires, cables and/or tubes routed the full length of the cabin. At the same time, there is a need to reduce the cost of the installation and weight added to the aircraft with respect to above floor secondary shielding and with respect to positioning a track cover panel in overlying relationship to the raceway. In addition, there is a need to utilize unused space in the aircraft for the wire runs and improve the visual appearance within a cabin and avoid protrusions created in the floor covering with floor wire run installations positioned above the floor. Moreover, there is a need to position and secure a raceway below floor level, which supports and directs wire run components, and provide ease in efforts for securing a floor panel into position which at the same time provides securement to the raceway.

SUMMARY

An example includes an apparatus for securing a raceway assembly within an aircraft, which includes a clip assembly associated with the raceway assembly, which secures the raceway assembly to a seat rail. The apparatus further includes a floor panel positioned in overlying relationship to the raceway assembly and to the clip assembly.

An example includes a method for installing a raceway assembly within an aircraft, which includes engaging a clip assembly, associated with the raceway assembly, with a seat rail securing the raceway assembly to the seat rail. The method further includes positioning a floor panel in overlying relationship to the raceway assembly and the clip assembly.

The features, functions, and advantages that have been discussed can be achieved independently in various embodiments or may be combined in yet other embodiments further details of which can be seen with reference to the following description and drawings.

DESCRIPTION

Routing wires, cables, and/or tubes or the like within a passenger or cargo cabin of an aircraft is needed for servicing passengers within a passenger cabin or for servicing various locations within a cargo cabin. Servicing in both instances is needed along an entire length of the cabin. With respect to a passenger or cargo cabin, routing of wires, cables and/or tubes and the like provides amenities, as discussed earlier, to seating locations for passengers or for various locations within a cargo cabin.

In providing the routing of cables, wires, and/or tubes and the like, whether for passenger or cargo cabins, there is a need to provide improved visual appearance of the interior of the cabin and to provide a level floor without protrusions, to reduce aircraft operation costs, to enhance ergonomic installation efforts, and to reduce installation costs. In addition, there is a need to utilize available space within the aircraft for routing wiring runs along the entire length of the cabin of the aircraft. Two examples of raceway assemblies and clip assemblies associated with the raceway assemblies, will be discussed herein for installing raceway assemblies along a seat rail positioned below floor level of the cabin and along the length of a cabin. The examples described herein provide ease in installation of the raceway assemblies by way of securing a floor panel in overlying position with respect to the raceway assembly with the raceway assembly having been secured to the seat rail prior to final installation of the floor panel, which will provide final securement of the raceway assembly to the seat rail.

Raceway assemblies 12 can be constructed of a wide variety of materials, including plastic, metal or other materials suitable for carrying the weight of cables, wires, tubes or the like. Also, raceway assemblies 12 can be constructed of various sizes and shapes as needed to accommodate routing of the cables 18, wires and/or tubes or the like.

Figure 1:
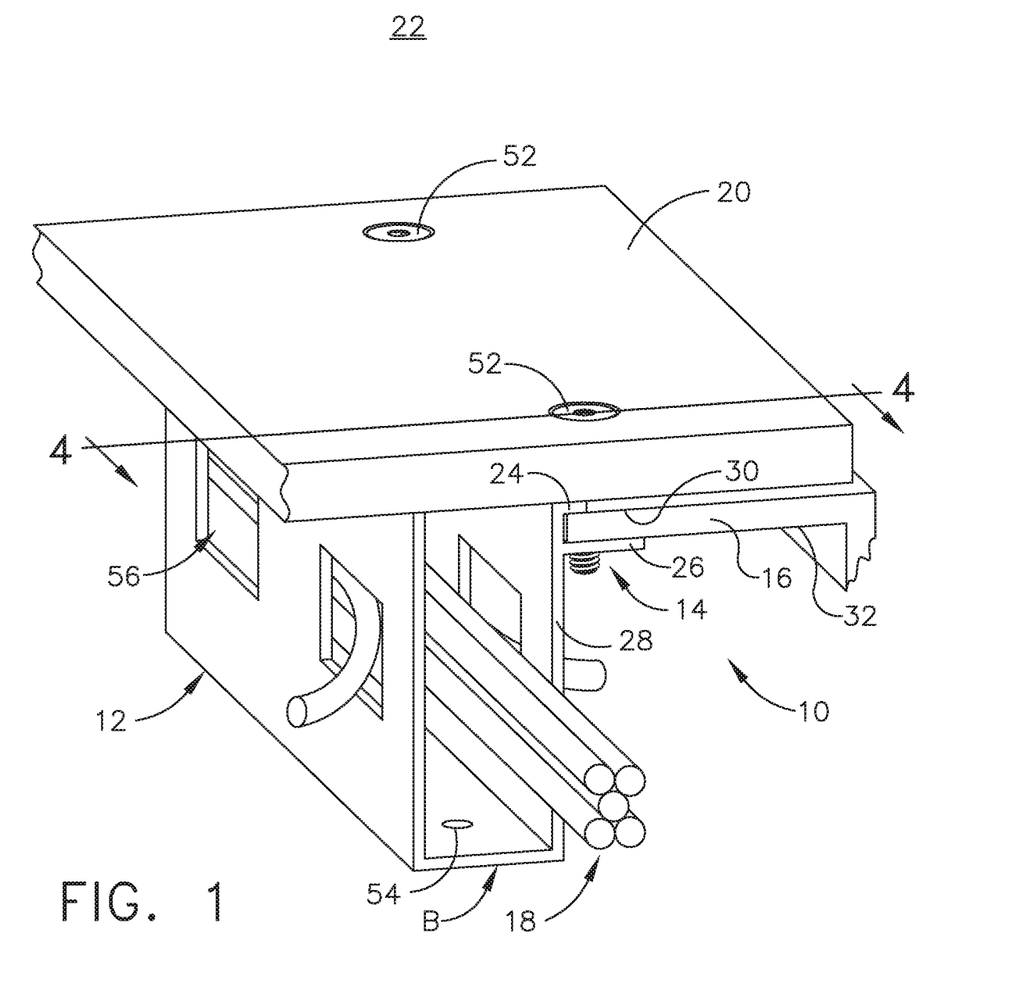
FIG. 1 is a perspective cut away view of a floor panel, in overlying relationship to a raceway assembly and a clip assembly, with the floor panel bolted to, a seat rail, in partial view, and to a first example of the raceway assembly having a first example of the clip assembly associated with the first example of the raceway assembly, wherein the clip assembly provides securement of the raceway assembly to the seat rail.

In referring to FIG. 1, first example of apparatus 10, herein referred to as apparatus 10, for securing a first example of raceway assembly 12, hereinafter referred to as raceway assembly 12, within an aircraft (not shown), includes first example of clip assembly 14, hereinafter referred to as clip assembly 14, associated with raceway assembly 12, which secures raceway assembly 12 to seat rail 16. As seen in FIG. 1, cables 18, for example, are shown being routed within raceway assembly 12. As mentioned earlier, the content of raceway assembly 12 can include a wide variety of items such as cables 18, wires, and/or tubes, which can carry pressurized air or consumable liquids or other items that can serve passengers at seat locations or serve various locations within a cabin which carries cargo. As can be seen, raceway assembly 12, is positioned below floor panel 20 and out of the way of passenger traffic or cargo which moves about on floor panel 20 within interior 22 of a passenger or a cargo cabin.

Seat rails 16 generally extend along an entire length of a cabin of an aircraft beneath the floor of the cabin and have available space adjacent to and along the length of seat rail 16. As will be discussed herein, raceway assembly 12 will be secured to seat rail 16 with clip assembly 14, with floor panel 20 being subsequently installed within the aircraft. Floor panel 20 is installed overlying raceway assembly 12, clip assembly 14, and seat rail 16, as seen for example in FIG. 4, further securing raceway assembly 12 to seat rail 16 and securing floor panel 20 to seat rail 16 and raceway assembly 12. Overlying can include either an item is positioned on or over another item. In this example, floor panel 20 overlies on raceway assembly 12 and on clip assembly 14, and overlies over seat rail 16.

The securing of seat rail 16 to raceway assembly 12, with clip assembly 14, allows clip assembly 14 to secure or grasp seat rail 16 to raceway assembly 12, prior to installation of floor panel 20. This assembling, as will be discussed herein, provides ease in installation of floor panel 20 to seat rail 16 and at the same time further securing raceway assembly 12 to seat rail 16. Raceway assembly 12 can be pre-filled with content such as cables 18, for example, prior to securing raceway assembly 12 with clip assembly 14 to seat rail 16. Alternatively, with raceway assembly 12 in a secured position with respect to seat rail 16, the installer can conveniently fill content of, for example, cables 18 into raceway assembly 12 prior to installation of floor panel 20. The securement of raceway assembly 12 to seat rail 16 with clip assembly 14 provides time savings and efficiencies with respect to installation of cables 18, for example, and provides ergonomic benefits to the installer with not having to experience extended time in awkward and/or kneeling positions during installation of raceway assembly 12 and floor panels 20.

Seat rail 16, as earlier mentioned, extends along the length of a cabin (not shown) of the aircraft. In a first example, as seen in FIGS. 1-5C, apparatus 10 for securing first example of raceway assembly 12 within an aircraft (not shown) includes clip assembly 14 having first wall member 24 and second wall member 26 which are each connected to and extend away from wall 28 of raceway assembly 12. First wall member 24 and second wall member 26 are spaced apart from one another. In this example, first and second wall members 24, 26 are integrally connected to wall 28.

Figure 2:
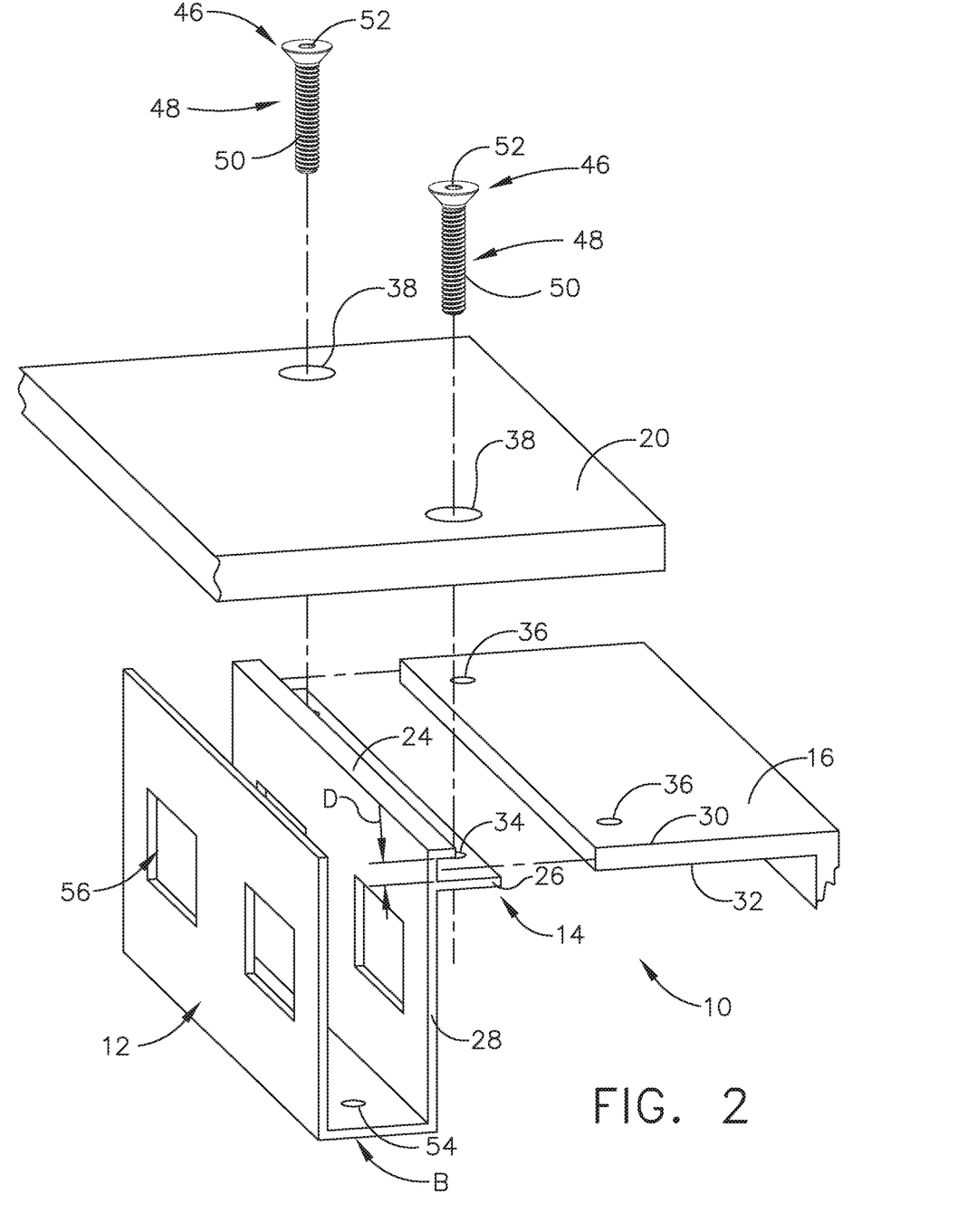
FIG. 2 is an exploded view of FIG. 1.

First wall member 24 and second wall member 26 are spaced apart from one another distance D, as seen in FIG. 2, which permits seat rail 16 to be positioned between first wall member 24 and second wall member 26 with a first side 30 of seat rail 16 in contact with and which extends along first wall member 24 and with second side 32 of seat rail 16 in contact with and which extends along second wall member 26. Distance D is selected to provide a snug fit with seat rail 16 positioned between first wall member 24 and second wall member 26. The snug fit provides the installer ease in positioning seat rail 16 into position between first and second wall members 24, 26 and at the same time allows first and second wall members 24, 26 to grasp seat rail 16 and hold seat rail 16 in a desired position relative to raceway assembly 12.

Figure 3:
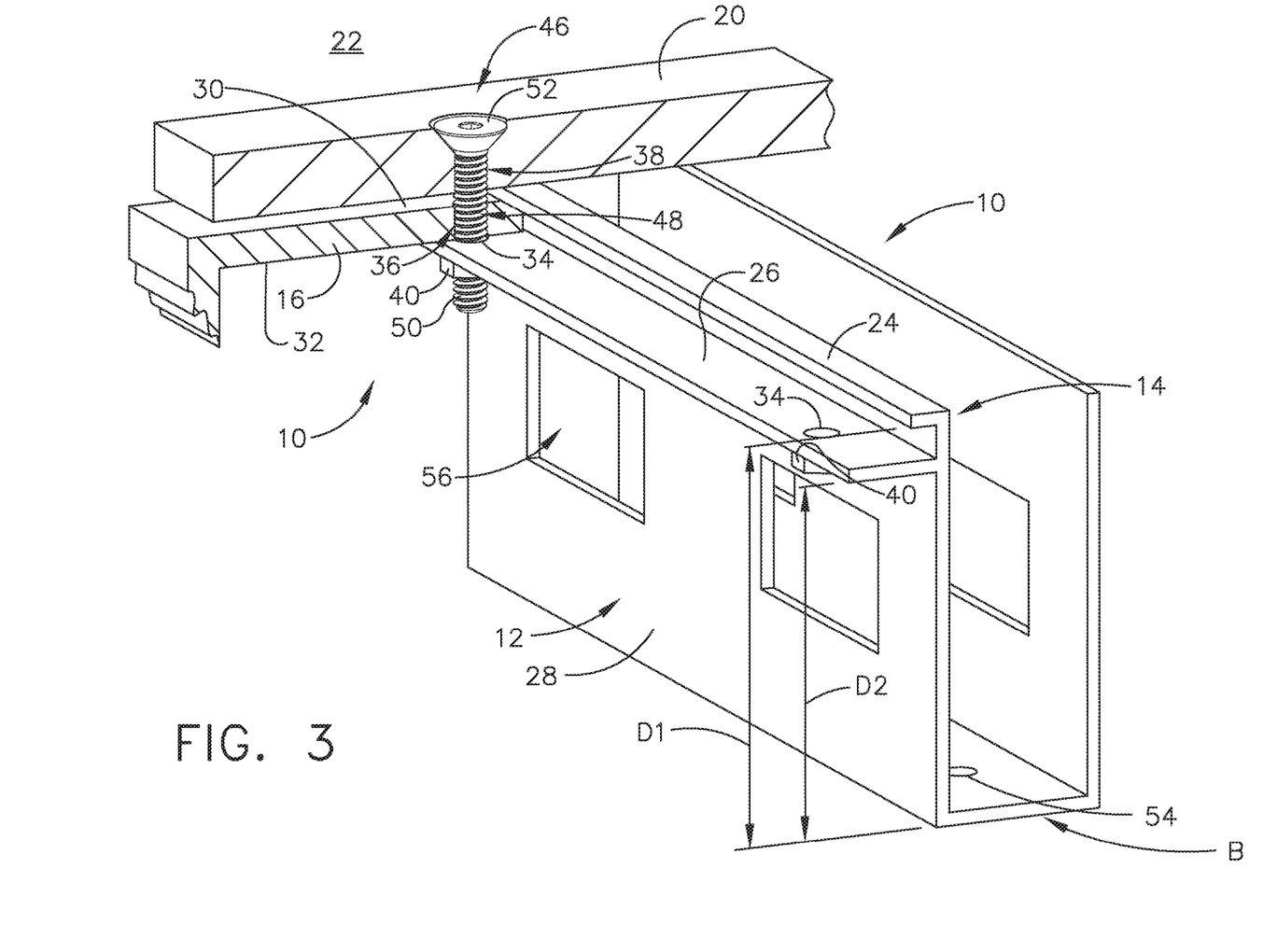
FIG. 3 is a perspective partial cross section view of the floor panel and the seat rail, as seen along line 4-4, of FIG. 1, with the bolt and first example of the raceway assembly and first example of the clip assembly not in cross section.

First wall member 24 extends from wall 28 of raceway assembly 12 and is positioned at a greater first distance D1 from base B of raceway assembly than second distance D2 of second wall member 26 as seen in FIG. 3. In this example, second wall member 26 extends further away from wall 28 than first wall member 24.

Second wall member 26 defines first opening 34, as seen in FIG. 3, which extends through second wall member 26. Seat rail 16 defines second opening 36 which extends through seat rail 16, as seen in FIG. 2. With seat rail 16 positioned in a desired position between first and second wall members 24, 26, first opening 34 and second opening 36 are positioned in alignment with one another, as seen in FIG. 3.

Figure 4:
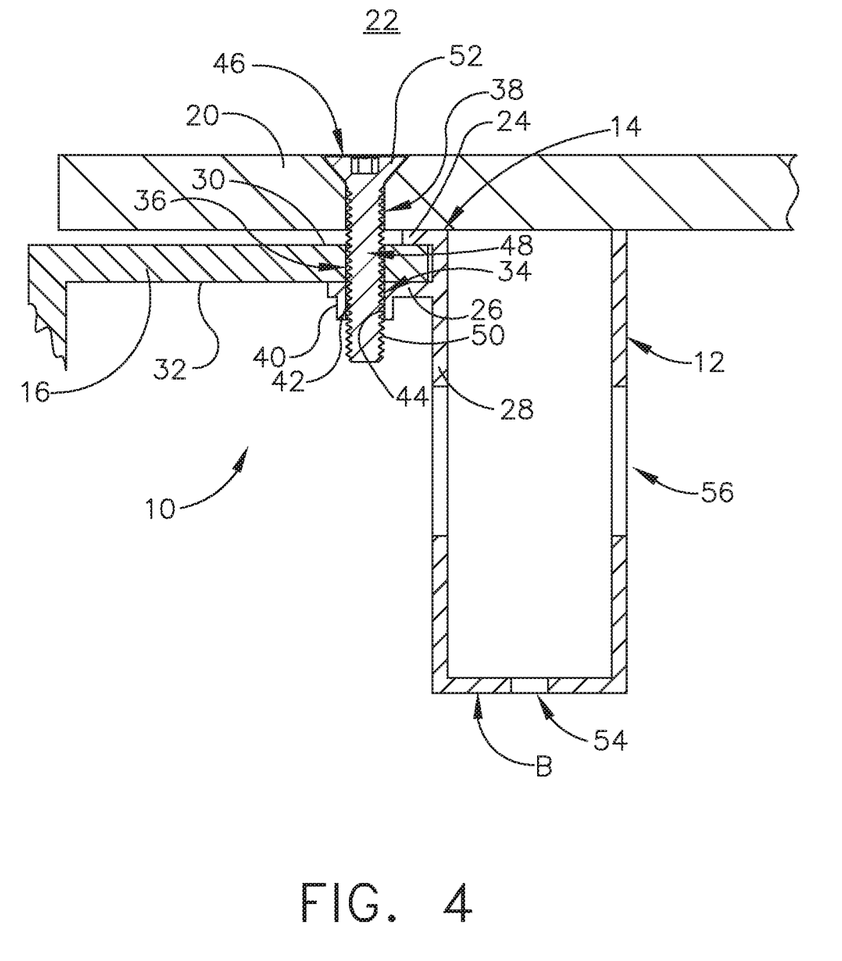
FIG. 4 is a cross section view along line 4-4 of FIG. 1.

Floor panel 20, defines third opening 38, as seen in FIG. 2. First opening 34, second opening 36 and third opening 38 as seen in FIG. 4, are positioned in alignment with one another with floor panel positioned in overlying relationship to raceway assembly 12. Second wall member 26 has nut 40, as seen in FIG. 3-5C, secured to second wall member 26 of raceway assembly 12. Nut 40 defines nut opening 42 which extends through nut 40 with threads (not shown) defined along an inner wall 44 of nut opening 42. Nut opening 42, first opening 34, second opening 36, and third opening 38 are positioned in alignment with one another as seen in FIG. 4. Bolt 46 having at least of portion of a shaft 48 of bolt 46, which defines threads 50 compatible with the threads (not shown) defined along the inner wall 44 of nut opening 42.

Figure 5A:
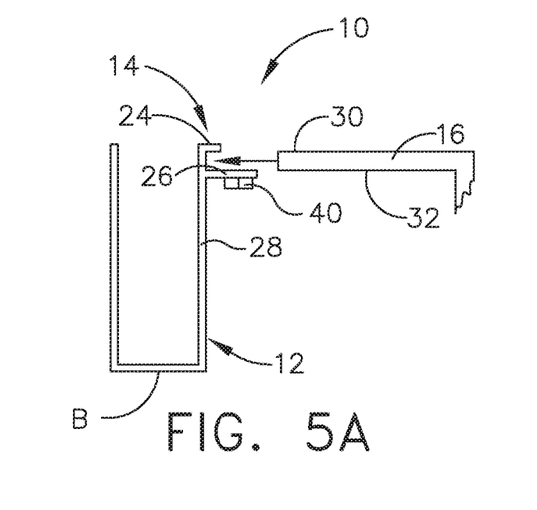
FIG. 5A is a schematic view of the seat rail, in partial view, engaging the first example of the clip assembly of the first example of the raceway assembly of FIG. 1.
Figure 5B:
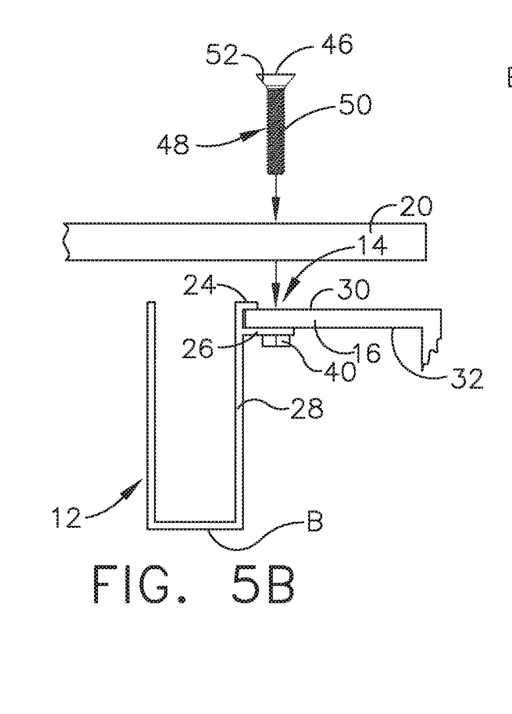
FIG. 5B is a schematic view of positioning a bolt to extend through a floor panel, which is in overlying relationship to the first example of the raceway assembly and the first example of the clip assembly, the seat rail, the first example of the clip assembly of the first example of the raceway assembly and nut secured to the first example of the clip assembly of FIG. 5A.
Figure 5C:
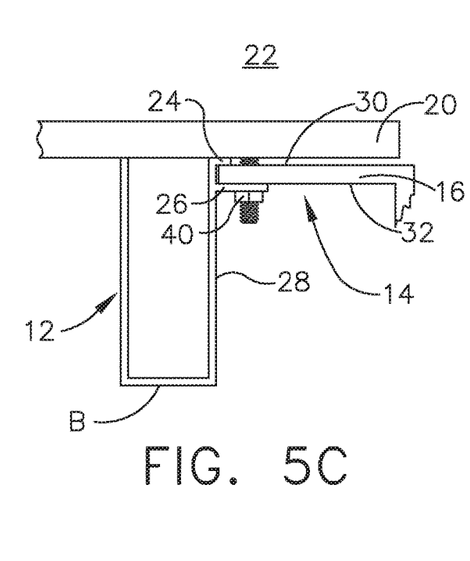
FIG. 5C is a schematic view of FIG. 5B with the floor panel, in overlying relationship to the first example of the raceway assembly and the clip assembly, the seat rail, and the first example of the clip assembly of the first example of the raceway assembly, secured together with the bolt engaging the nut secured to the first example of the clip assembly.

In referring to FIGS. 5A-5C, the installer positions seat rail 16 between first and second wall members 24, 26 with first and second wall members 24, 26 grasping or otherwise holding seat rail 16. At the same time, installer positions into alignment first opening 34 of second wall member 26, second opening 36 of seat rail 16, and nut opening 42 of nut 40, as seen in FIG. 4. With cables 18 or other content of raceway assembly 12 in place within raceway assembly 12, floor panel 20 is positioned overlying raceway assembly 12, with third opening 38 of floor panel 20 positioned in alignment with first opening 34, second opening 36, third opening 38 and nut opening 42. With the alignment of openings, bolt 46 can be extended through third opening 38, second opening 36 and into first opening 34 with threads 50 of bolt 46 engaging threads (not shown) of nut 40. With securement of bolt 46 with nut 40, head 52 of bolt 46 and nut 40 exert a compressive securement force between floor panel 20 and first wall member 24, and a compressive force between first wall member 24 and second wall member 26 with seat rail 16 being positioned there between. As a result, floor panel 20 is secured to seat rail 16 and raceway assembly 12 is secured to seat rail 16. With bolt 46 secured, head 52 is positioned so as not to protrude from floor panel 20.

Raceway assembly 12, in this example, defines at least one drain opening 54 defined through wall 28 of raceway assembly 12 for draining fluid out of raceway assembly 12, as seen in FIGS. 1-4. Raceway assembly, in this example, also defines passageway 56 through wall 28 of raceway assembly 12 for passage of contents, such as cables 18 or the like as described earlier, which are contained within raceway assembly 12. Passageway 56 provides for cables 18 within raceway assembly 12, for example, to extend out of raceway assembly 12 as seen, for example, in FIG. 1. Passageways 56 permit routing cables 18, wires and/or tubes to be directed out of and away from raceway assembly 12 to locations within the cabin of the aircraft as needed.

In referring to FIG. 6, second example of apparatus 10', hereinafter referred to as apparatus 10', for securing a second example of raceway assembly 12', hereinafter referred to as raceway assembly 12', within an aircraft (not shown) includes second example of clip assembly 14', hereinafter referred to as clip assembly 14', associated with raceway assembly 12', which secures raceway assembly 12' to seat rail 16. As mentioned earlier, content of raceway assembly 12' can include a wide variety of items such as cables 18, wires and/or tubes, which can provide amenities that can serve passengers at seat locations or serve various locations within a cabin which carries cargo. As can be seen, raceway assembly 12', is positioned below floor panel 20 and out of the way of passenger traffic or freight which moves around on floor panel 20 within interior 22 of a passenger or a cargo cabin.

As previously discussed, seat rails 16 generally extend along an entire length of a cabin of an aircraft beneath the floor of the cabin and have available space adjacent to and along the length of seat rail 16. As will be discussed herein, raceway assembly 12' will be secured to seat rail 16 with clip assembly 14' with floor panel 20 being subsequently installed within the aircraft. Floor panel 20 is installed overlying raceway assembly 12', clip assembly 14', and seat rail 16, further securing raceway assembly 12' to seat rail 16 and securing floor panel 20 to seat rail 16 and raceway assembly 12', as seen for example in FIG. 9. Overlying, as mentioned earlier, can include either an item is positioned on or over another item. In this example, floor panel 20 overlies on raceway assembly 12' and on clip assembly 14', and overlies over seat rail 16.

The securing of seat rail 16 to raceway assembly 12' with clip assembly 14' allows clip assembly 14' to secure or grasp seat rail 16 to raceway assembly 12', prior to installation of floor panel 20. This assembling provides ease in installation of floor panel 20 to seat rail 16 and at the same time further securing raceway assembly 12' to seat rail 16. Raceway assembly 12' can, in one example, be pre-filled with content of cables 18, for example, prior to securing raceway assembly 12' with clip assembly 14' to seat rail 16. In another example, with raceway assembly 12' in a secured position with respect to seat rail 16, the installer can conveniently fill content of cables 18, for example, into raceway assembly 12' prior to installation of floor panel 20. The securement of raceway assembly 12' to seat rail 16 with clip assembly 14' provides time savings and efficiencies with respect to installation of cables 18, for example, and provides ergonomic benefits to the installer with not having to experience extended time in awkward and/or kneeling positions during installation of raceway assembly 12' and floor panels 20.

Seat rail 16, as earlier mentioned, extends along the length of a cabin (not shown) of the aircraft. In second example of apparatus 10', as seen in FIGS. 6-10D, for securing raceway assembly 12' within an aircraft (not shown) includes clip member 58 which includes first arm 60 and second arm 62, as seen in FIG. 7, which oppose each other. First and second arms 60, 62 are connected together at one end 64 of the clip member 58. Clip member 58 is positioned extending through clip opening 66, as seen in FIGS. 7 and 9, defined by and extends through wall 68 of the raceway assembly 12'. With the clip member 58 positioned extending through clip opening 66, first arm 60 and second arm 62 extend in direction 70 away from raceway assembly 12' as seen in FIGS. 7-9, and are spaced apart from one another.

First arm 60 and second arm 62 are spaced apart from one another distance D3, which permits seat rail 16 to be positioned between first arm 60 and second arm 62 with first arm 60 in contact with first side 72 of seat rail 16 and second arm 62 in contact with lip member 74 of raceway assembly 12' and lip member 74 in contact with second side 76 of seat rail 16. Distance D3 is selected to provide a snug fit with seat rail 16 and lip member 74 positioned between first arm 60 and second arm 62. Clip member 58 can be constructed such that as first and second arms 60, 62 are moved away from each other, first and second arms 60, 62 are resilient and exert a restorative force such that first and second arms 60, 62 apply a compressive force to items positioned between first and second arms 60, 62. The snug fit provides the installer ease in positioning seat rail 16 and lip member 74 between first and second arms 60, 62 such that raceway assembly 12' by way of clip assembly 14' and lip member 74 grasps or secures seat rail 16 to be positioned and held between first arm 60 and second arm 62 in a desired position relative to raceway assembly 12'.

First arm 60 extends from wall 68 of raceway assembly 12' positioned a fourth distance D4 from base B' of raceway assembly 12', a greater distance than fifth distance D5 of second arm 62 being positioned from base B'. First arm 60 defines first opening 78 which extends through first arm 60. Seat rail 16 defines second opening 80 which extends through seat rail 16. Lip member 74, which extends from wall 68 of the raceway assembly 12', defines third opening 82 which extends through lip member 74. Second arm 62 defines fourth opening 84 which extends through second arm 62. With seat rail 16 positioned between first arm 60 and second arm 62 in the desired position, first opening 78, second opening 80, third opening 82 and fourth opening 84 are positioned in alignment with one another, as seen in FIG. 9.

Floor panel 20 defines fifth opening 86. With floor panel 20 positioned in overlying relationship for securement to raceway assembly 12' and seat rail 16, fifth opening 86 defined in and through floor panel 20 is in alignment with first opening 78, second opening 80, third opening 82 and fourth opening 84. Second arm member 62 has nut 88 secured to second arm 62 with nut 88 defining nut opening 90 which extends through nut 88 with threads (not shown) defined along inner wall 92 of nut opening 90, as seen in FIG. 9. With floor panel 20 in position to be secured to seat rail 16, and raceway assembly 12', first opening 78, second opening 80, third opening 82, fourth opening 84, nut opening 90 and fifth opening 86 are in alignment with one another. Bolt 46, as seen in FIG. 7, having at least a portion of shaft 48 of bolt 46 which defines threads 50 compatible with the threads (not shown) defined along inner wall 92 of nut opening 90.

Figure 9:
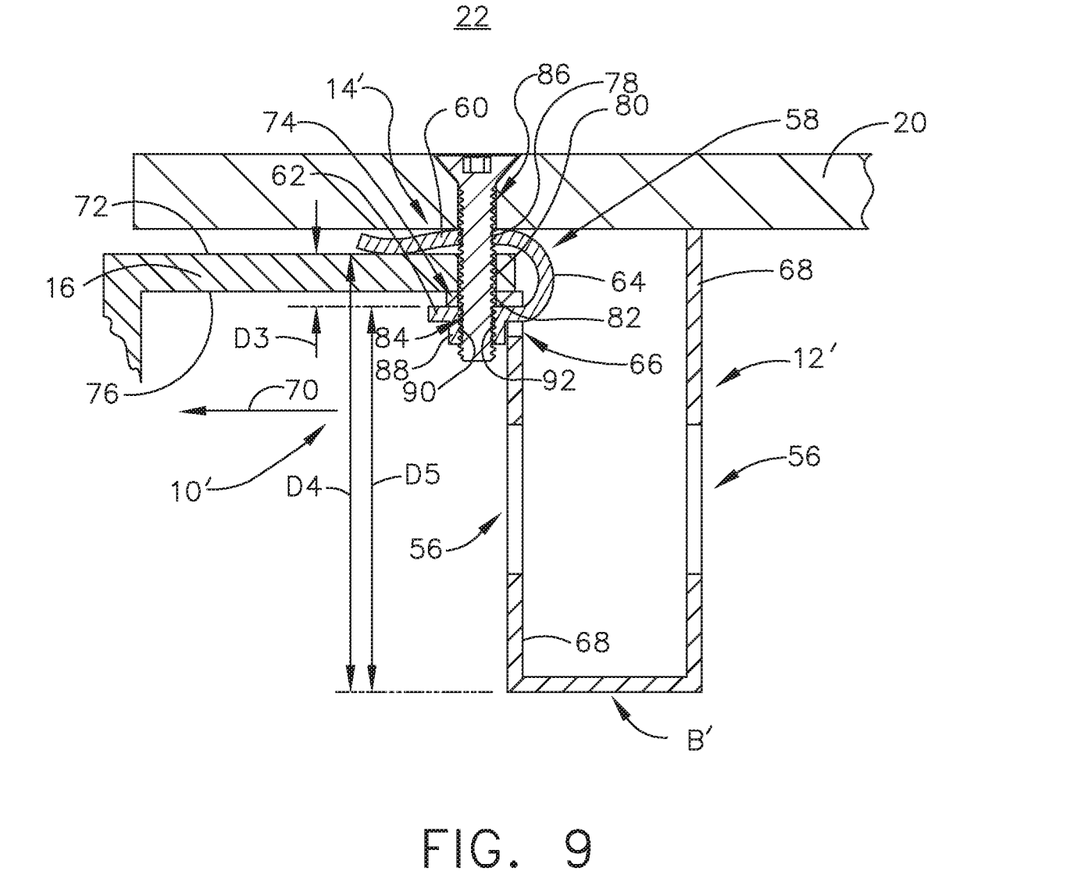
FIG. 9 is a cross section view along line 9-9 of FIG. 6.
Figure 10A:
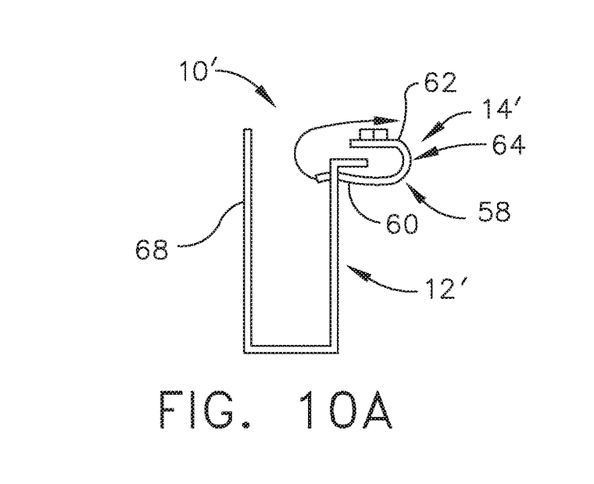
FIG. 10A a schematic view of the second example of the clip assembly associated with the second example of the raceway assembly, of FIGS. 6-8, with the second example of the clip assembly being installed, through a clip opening within the second example of the raceway assembly, with respect to the second example of the raceway assembly.
Figure 10B:
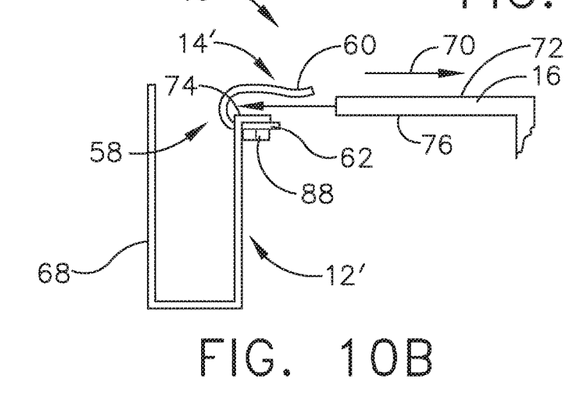
FIG. 10B is a schematic view, of FIG. 10A, with the second example of the clip assembly installed in relationship to the second example of the raceway assembly with a seat rail, in partial view, positioned to be engage the clip assembly.
Figure 10C:
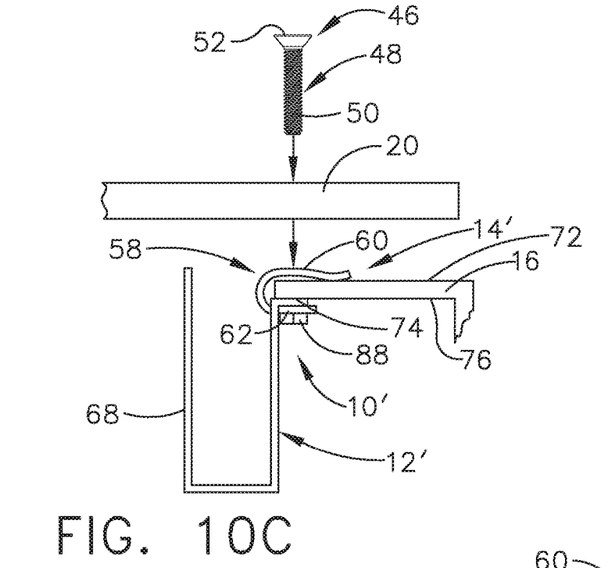
FIG. 10C is a schematic view of the seat rail secured by the second example of the clip assembly of FIG. 10B to the second example of the raceway assembly and a bolt aligned to secure a floor panel, in overlying relationship to the raceway assembly and the clip assembly, a first arm of the second example of the clip assembly, the seat rail, a lip of the second example of the raceway assembly and to a second arm of the second example of the clip assembly.
Figure 10D:
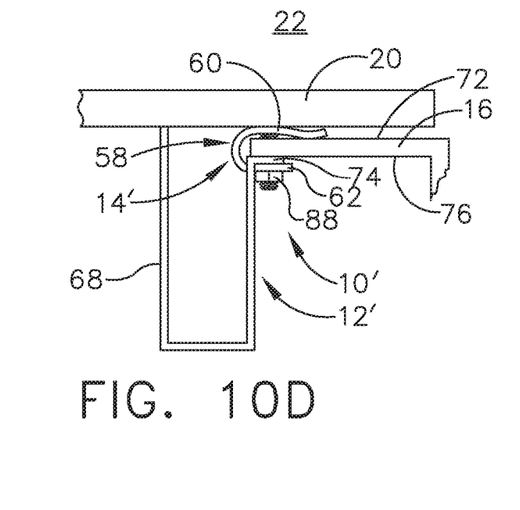
FIG. 10D is the schematic view of FIG. 10C with the bolt secured to a nut secured to the second arm of the second example of the clip assembly.

In referring to FIGS. 10A-10D, the installer positions clip member 58 through clip opening 66 in wall 68, shown in FIG. 7. Clip member 58 is moved through clip opening 66 such that first and second arms 60, 62 extend in direction 70 as seen in FIG. 10B. The installer moves clip member 58 with raceway assembly 12' toward seat rail 16 with seat rail 16 securing or grasping seat rail 16 as seen in FIG. 10C. With seat rail 16 secured between first arm 60 and second arm 62 openings, the installer places clip member 58 in a desired position which aligns first opening 78 of first arm 60, second opening 80 of seat rail 16, third opening 82 of lip member 74, and fourth opening 84 of second arm 62, along with nut opening 90 of nut 88 as discussed above. With the alignment of these above described openings, floor panel 20 is positioned in overlying position relative to raceway assembly 12', clip member 58 and seat rail 16. Bolt 46 with shaft 48 defining threads 50 is positioned through the aligned openings with threads 50 securing to threads (not shown) defined by inner wall 92 of nut opening 90, as seen FIG. 9. With tightening of bolt 46, floor panel 20, as seen in FIG. 10D, is secured to seat rail 16 and raceway assembly 12' with head 52 of bolt 46 and nut 88 applying a compressive force to floor panel 20, clip member 58, seat rail 16 and lip member 74 of raceway assembly 12'. With bolt 46 secured, head 52 is positioned so as not to protrude from floor panel 20.

Figure 6:
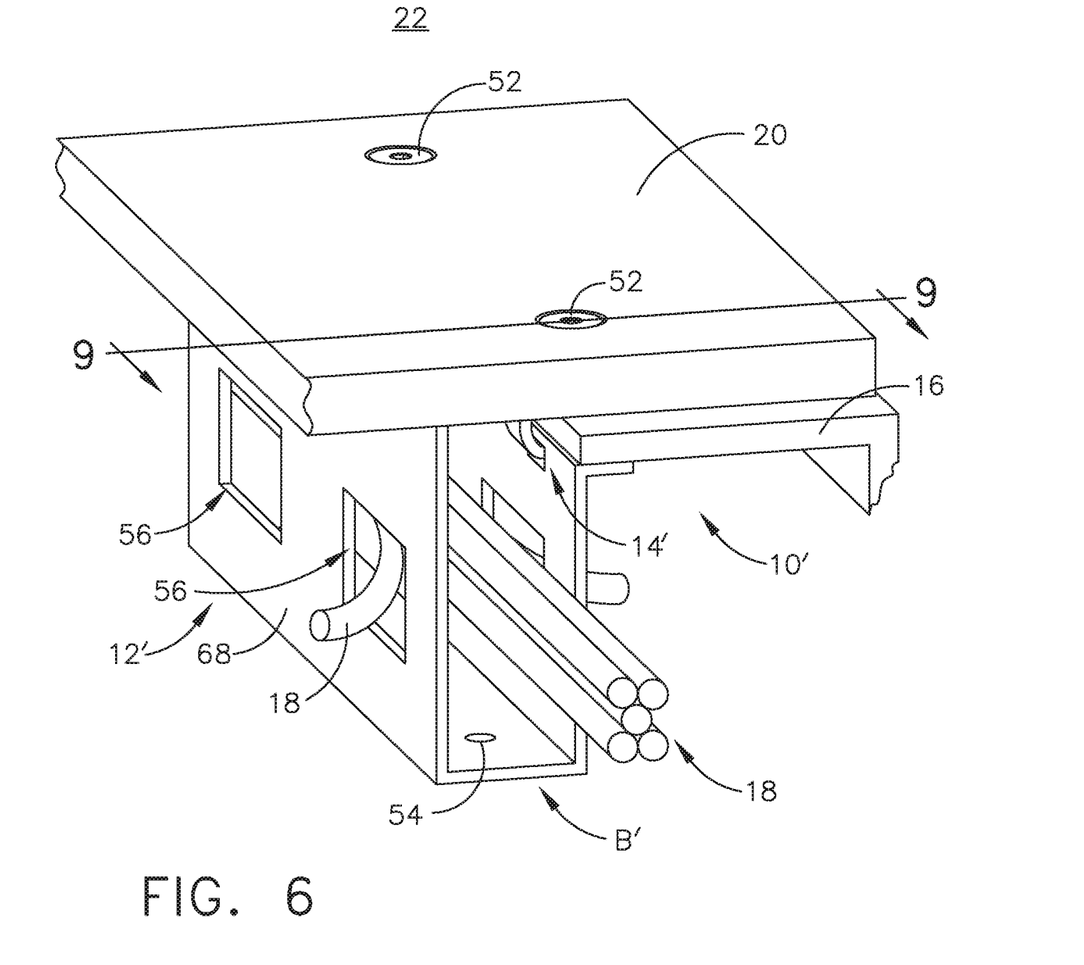
FIG. 6 is a perspective cut away view of a floor panel, in overlying relationship to a second example of a raceway assembly and a clip assembly, bolted to, a seat rail, in partial view, and to a second example of a raceway assembly having a second example of a clip assembly associated with the second example of the raceway assembly, wherein the second example of the clip assembly provides securement of the raceway assembly to the seat rail.
Figure 7:
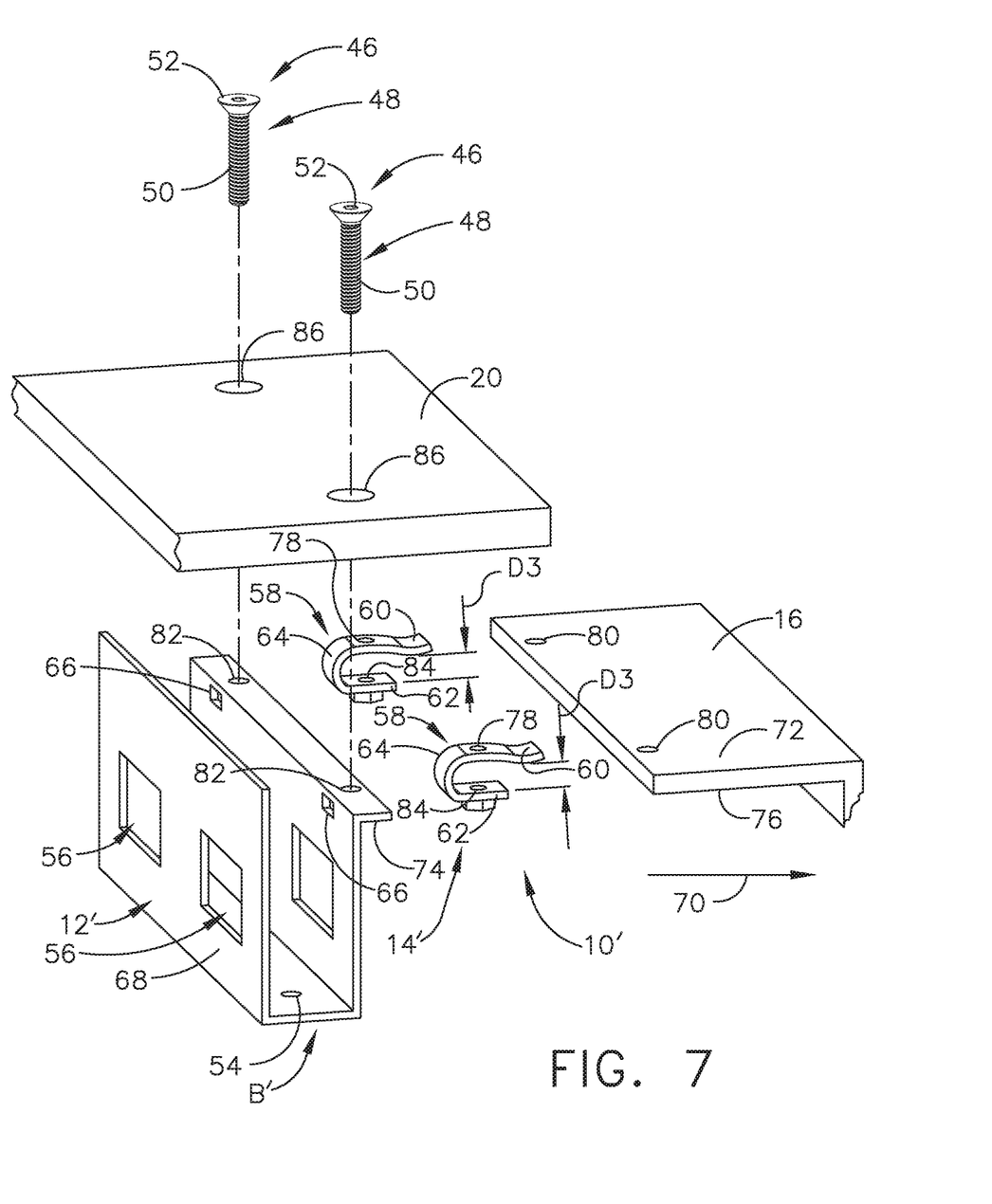
FIG. 7 is an exploded view of FIG. 6.
Figure 8:
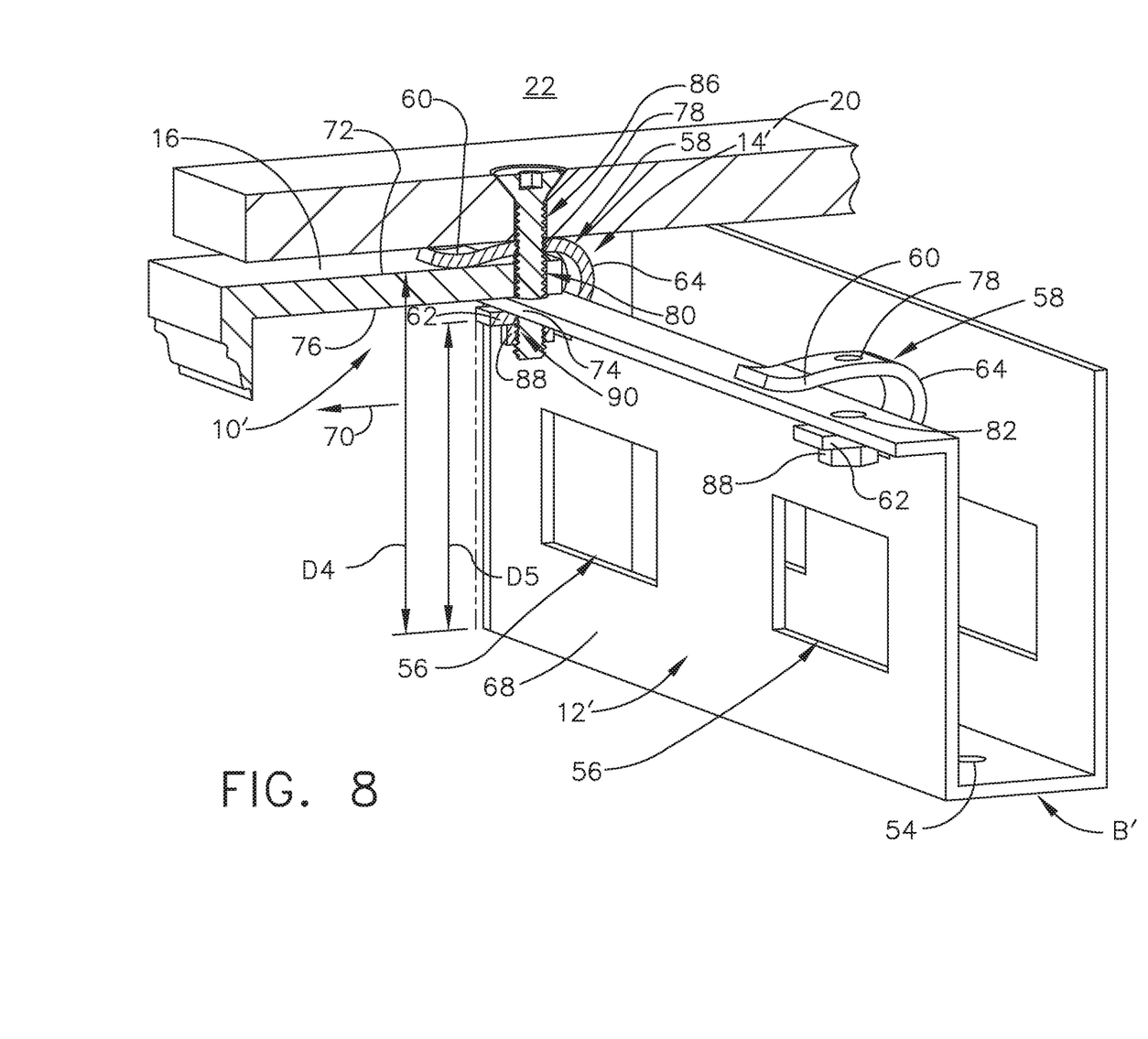
FIG. 8 is a perspective partial cross section view of the floor panel, bolt, second example of the clip assembly and the seat rail, as seen along line 6-6, of FIG. 6, with the second example of the raceway assembly and a second, second example of the clip assembly not in cross section.

As earlier discussed, raceway assembly 12', in this example, defines at least one drain opening 54 defined through wall 68 of raceway assembly 12 for draining fluid out of raceway assembly 12', as seen in FIGS. 6-8. Raceway assembly 12', in this example, also defines passageway 56 through wall 68 of raceway assembly 12' for passage of contents, such as for example, cables 18 or the like as described earlier, contained within raceway assembly 12', to extend through passageway 56 and out of raceway assembly 12' as seen, for example, in FIG. 6. Passageways 56 permit routing cables 18, wires and/or tubes and the like positioned within raceway assembly 12' to be directed out of and away from raceway assembly 12' to locations within the cabin of the aircraft as needed.

Figure 11:
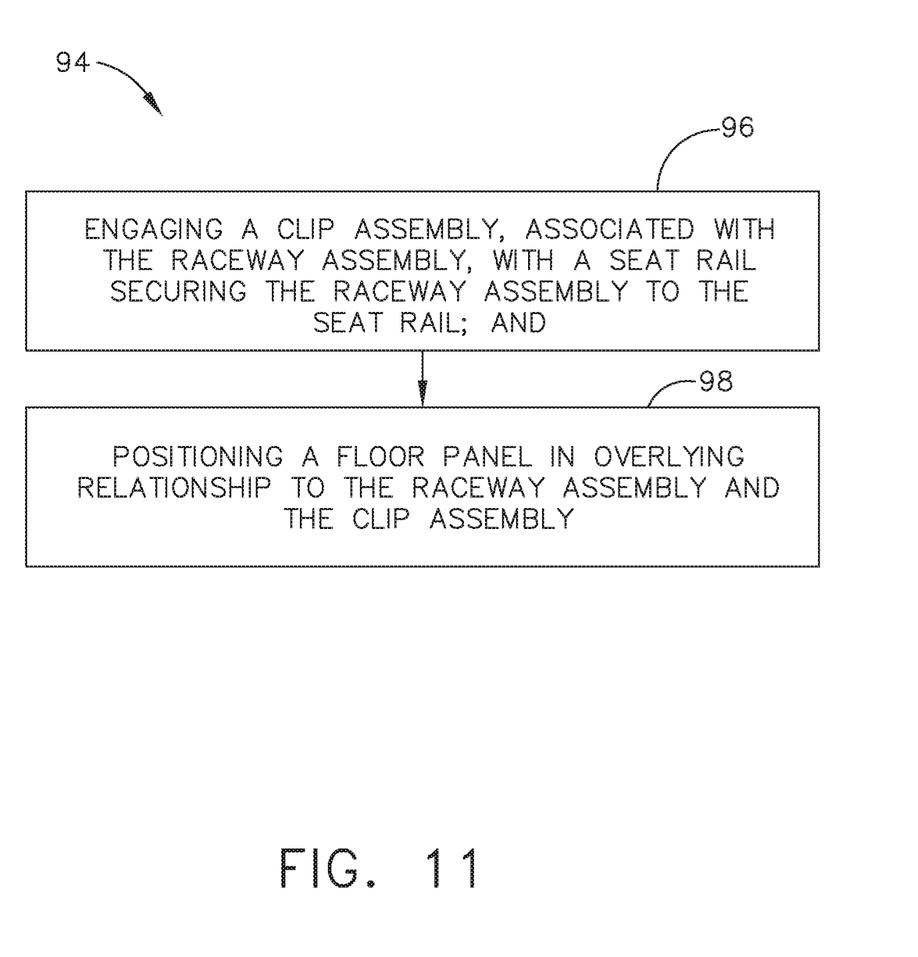
FIG. 11 is a flow chart of a method for installing a raceway assembly to within an aircraft.

In referring to FIG. 11, method 94 for installing raceway assembly 12, 12' within an aircraft, engaging 96 a clip assembly 14, 14', associated with raceway assembly 12,12', with seat rail 16 securing raceway assembly 12, 12' to seat rail 16. Method 94 further includes positioning 98 floor panel 20 in overlying relationship to raceway assembly 12, 12' and clip assembly 14, 14'. In one example, clip assembly 14, includes first wall member 24 and second wall member 26 each connected to and extending from wall 28 of raceway assembly 12. First wall member 24 and second wall member 26 are spaced apart from one another. First wall member 24 and second wall member 26 are spaced apart from one another distance D, which permits seat rail 16 to be positioned between first wall member 24 and second wall member 26 with first side 30 of seat rail 16 in contact with and extending along first wall member 24 and second side 32 of seat rail 16 in contact with and extending along second wall member 26.

In a second example, clip assembly 14' includes clip member 58 comprising first arm 60 and second arm 62 which oppose each other and which are connected together at one end 64 of clip member 58. Clip member 58 is associated with raceway assembly 12' with positioning clip member 58 to extend through clip opening 66, which is defined by and extends through wall 68 of raceway assembly 12'. With clip member 58 positioned extending through clip opening 66, first arm 60 and second arm 62 extend away from raceway assembly 12'.

First and the second arms 60, 62 are spaced apart from one another. First arm 60 and second arm 62 are spaced apart from one another a distance D, which permits seat rail 16 to be positioned between first arm 60 and second arm 62 with first arm 60 in contact with first side 72 of the seat rail 16 and second arm 62 in contact with lip member 74 of raceway assembly 12' and lip member 74 in contact with second side 76 of seat rail 16. Seat rail 16 is grasped by clip assembly 14' positioned between first arm 60 and second arm 62.

While various embodiments have been described above, this disclosure is not intended to be limited thereto. Variations can be made to the disclosed embodiments that are still within the scope of the appended claims.

What is claimed:

1. An apparatus for securing a raceway assembly within an aircraft, comprising:
   a clip assembly associated with the raceway assembly, which secures the raceway assembly to a seat rail, wherein the clip assembly, comprises:
      a clip member comprising a first arm and a second arm, which oppose each other, and the first arm and the second arm are connected together at one end of the clip member;
      the second arm of the clip member is positioned extending through a clip opening, defined by a wall of the raceway assembly; and
      with the clip member positioned extending through the clip opening, the first arm and the second arm extend in a direction away from the wall of the raceway assembly; and
   a floor panel positioned in overlying relationship to the raceway assembly and the clip assembly.

2. The apparatus of claim 1, wherein:
   the raceway assembly defines at least one drain opening defined through a wall of the raceway assembly for draining fluid out of the raceway assembly; and
   the raceway assembly defines a passageway through the wall of the raceway assembly for passage of contents contained within the raceway assembly to extend through the passageway and out of the raceway assembly.

3. The apparatus of claim 1, wherein the first arm and the second arm are spaced apart from one another.

4. The apparatus of claim 3, wherein, with the first arm and the second arm spaced apart from one another a distance, such permits the seat rail to be positioned between the first arm and the second arm, with the first arm in contact with a first side of the seat rail and the second arm in contact with a lip member of the raceway assembly and the lip member in contact with a second side of the seat rail.

5. The apparatus of claim 4, wherein with the clip member positioned extending through the clip opening, the first arm extends from the wall of the raceway assembly and is positioned a greater distance from a base of the raceway assembly than a distance the second arm is positioned from the base of the raceway.

6. The apparatus of claim 5, wherein the first arm defines a first opening, which extends through the first arm.

7. The apparatus of claim 6, wherein the seat rail defines a second opening, which extends through the seal rail.

8. The apparatus of claim 7, wherein the lip member, which extends away from the wall of the raceway assembly, defines a third opening, which extends through the lip member.

9. The apparatus of claim 8, wherein the second arm defines a fourth opening, which extends through the second arm.

10. The apparatus of claim 9, wherein, with the seat rail positioned between the first arm and the second arm, the first opening, the second opening, the third opening and the fourth opening are positioned in alignment with one another.

11. The apparatus of claim 10, further includes the floor panel which defines a fifth opening, which extends through the floor panel, such that with the floor panel positioned in overlying relationship to the raceway assembly, the fifth opening is in alignment with the first opening, the second opening, the third opening and the fourth opening.

12. The apparatus of claim 11, wherein the second arm further includes a nut secured to the second arm with the nut defining a nut opening.

13. The apparatus of claim 12, wherein the nut opening is positioned in alignment with the first opening, the second opening, the third opening, the fourth opening and the fifth opening.

14. The apparatus of claim 13, further including a bolt having at least a portion of a shaft of the bolt defining threads compatible with threads defined along an inner wall of the nut opening, such that with the threads of the at least a portion of the bolt engaged to the threads defined along the inner wall of the nut opening, the bolt applies a compressive force between the nut and the floor panel.

15. The apparatus of claim 12, wherein with the first arm and the second arm extending away from the wall of the raceway assembly, the second arm is positioned between the nut and the lip member.

16. A method for installing a raceway assembly within an aircraft, comprising:
   engaging a clip assembly, associated with the raceway assembly, with a seat rail securing the raceway assembly to the seat rail, wherein:
      the clip assembly comprises a clip member having a first arm and a second arm, which oppose each other, and the first arm and second arm are connected together at one end of the clip member;
      the second arm of the clip member is positioned extending through a clip opening, defined by a wall of the raceway assembly; and
      with the clip member positioned extending through the clip opening, the first arm and the second arm extend in a direction away from the wall of the raceway assembly; and
   positioning a floor panel in overlying relationship to the raceway assembly and the clip assembly.

17. The method of claim 16, wherein: the first arm and the second arm are spaced apart from one another; and the first arm and the second arm are spaced apart from one another a distance, which permits the seat rail to be positioned between the first arm and the second arm with the first arm in contact with a first side of the seat rail and the second arm in contact with a lip member of the raceway assembly and the lip member in contact with a second side of the seat rail.

18. The method of claim 17, wherein:
   the first arm defines a first opening, which extends through the first arm;
   the seat rail defines a second opening, which extends through the seat rail;

the lip member defines a third opening, which extends through the lip member;

the second arm defines a fourth opening, which extends through the second arm; and with the seat rail positioned between the first arm and the second arm, the first opening, the second opening, the third opening and the fourth opening are positioned in alignment with one another.

19. The method of claim 18, further includes the floor panel which defines a fifth opening, which extends through the floor panel, such that with the floor panel positioned in overlying relationship to the raceway assembly, the fifth opening is in alignment with the first opening, the second opening, the third opening and the fourth opening.

20. The method of claim 19, wherein:

the second arm further includes a nut secured to the second arm with the nut defining a nut opening; and with the nut opening positioned in alignment with the first opening, the second opening, the third opening, the fourth opening and the fifth opening, a bolt having at least a portion of a shaft of the bolt defining threads compatible with threads defined along an inner wall of the nut opening, the bolt applies a compressive force between the floor panel and the nut with engagement of the threads of the at least a portion of the shaft and the threads defined along the inner wall of the nut opening.

\* \* \* \* \*